June 23, 1970 M. M. BECKA ET AL 3,516,892

TAPE STRIP FABRICATION AND HANDLING

Original Filed May 9, 1966 8 Sheets-Sheet 1

INVENTORS
Allen C. Harriman
BY Michael M. Becka
Albert Gordon ATT'Y

TAPE STRIP FABRICATION AND HANDLING

TAPE STRIP FABRICATION AND HANDLING

Original Filed May 9, 1966

TAPE STRIP FABRICATION AND HANDLING

United States Patent Office 3,516,892
Patented June 23, 1970

3,516,892
TAPE STRIP FABRICATION AND HANDLING
Michael M. Becka, Watertown, and Allen C. Harriman, Brockton, Mass., assignors to Jacob S. Kamborian, West Newton, Mass.
Original application May 9, 1966, Ser. No. 548,446. Divided and this application Nov. 18, 1968, Ser. No. 776,482
Int. Cl. B32b *31/18*
U.S. Cl. 156—522 8 Claims

ABSTRACT OF THE DISCLOSURE

An apparatus for fabricating a length of pressure sensitive tape having non-adherent backing strips adhered thereto and for positioning the length of tape above a workpiece to which it is to be attached.

This is a division of application Ser. No. 548,446 filed May 9, 1966.

The patent application discloses a machine for fabricating strips of tape and applying the tape strips to a shoe assembly that comprises a last having an insole located on its bottom so as to attach the insole to the last. After this attachment, a shoe upper is draped about the last and the margin of the upper is secured to the insole by a lasting operation. Following this, the tape strips are removed from the shoe assembly. The tape strips have non-adherent tabs at their ends which can be gripped and pulled to effect their removal from the shoe assembly.

One aspect of this invention is concerned with an apparatus in the machine for applying the tabs to the tape strips. The apparatus includes a housing containing a hammer and a knife, means for introducing a strip of tape and a strip of paper into the housing in such a manner that a free end of the paper overlaps an adhesive surface of the tape, and means for operating the hammer and knife so that the hammer presses the paper against the tape and the knife severs the free end of the paper from the remainder of the strip of paper.

Another aspect of the invention deals with the construction of the mounting of a knife that is used to sever the paper. The mounting includes a slot in which the knife is mounted, stop members extending into the slot and abutting against the knife, and retaining members that force the knife against the stop members.

Another aspect of the invention relates to a gripping device for gripping a free end of the tape so that the tape may be drawn over the shoe assembly. The gripping device comprises a pair of relatively movable pincers jaws that are so constructed that they can close on the tape in response to movement against a rigid abutting member.

Another aspect of the invention is concerned with a cutting mechanism for cutting a tape ribbon to form a strip of the tape. The cutting mechanism comprises a pair of pivotally mounted scissors blades and a drive means for effecting cutting movements of the blades.

Figure 20:
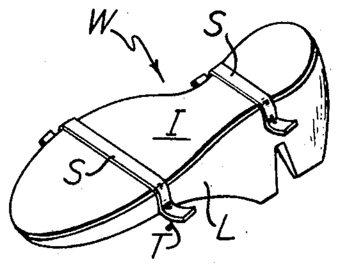
FIG. 20 is a view of the shoe assembly after having been operated on by the machine.
Figure 21:
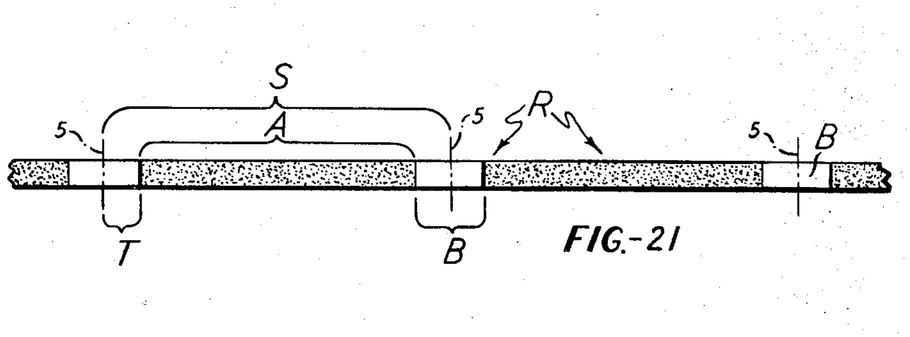
FIG. 21 is a view of the tape ribbon having backing strips applied thereto at predetermined intervals.

The machine of the instant disclosure is an apparatus which is operative to assemble a shoe assembly W as illustrated in FIG. 20. The shoe assembly W includes a last L having an insole I located in aligned, superposed position on the bottom of the last L and being secured thereto by means of a pair of tape strips S of unique construction. Referring to FIG. 21, as will be described later in detail, the tape strips S are fabricated from a ribbon R of pressure sensitive adhesive tape to which backing strips B are applied at predetermined intervals to the adhesive side and along the length of the tape ribbon R. The backing strips B may be fabricated from paper or other flexible material capable of adhering to the tape ribbon R. After the backing strips B have been applied to the tape ribbon R, the tape ribbon R is cut at the centerline of each of the backing strips B (along the lines 5 in FIG. 21) thereby severing the tape ribbon R into a number of tape strips S, each of which has a portion of the backing strip B adhered to the lengthwise extremities, thereby rendering these extremities non-adhesive. That portion of the tape ribbon R has been or is to be severed from the remainder of the tape ribbon R will be referred to as the tape strip S and that portion of the backing strip B which is to be or has been located at the extremities of the tape strip S will be referred to as the tab T. Each of the tape strips S thus has non-adhesive tabs T formed at the extremities thereof with an adhesive portion A (see FIG. 20) remaining exposed between the extremities.

Each tape strip S is applied transversely to the bottom of the insole I so that the ends of each tape strip S may be pressed to the sides of the last L, the exposed adhesive portion A of each tape strip S being of sufficient length to permit the tape strip S to adhere to the sides of the last L as well as to the bottom of the insole I. The non-adhesive tabs T of each tape strip S do not adhere to the sides of the last L and thus may serve to permit easy removal of the tape strips S from the shoe assembly in a manner later described.

Figure 2:
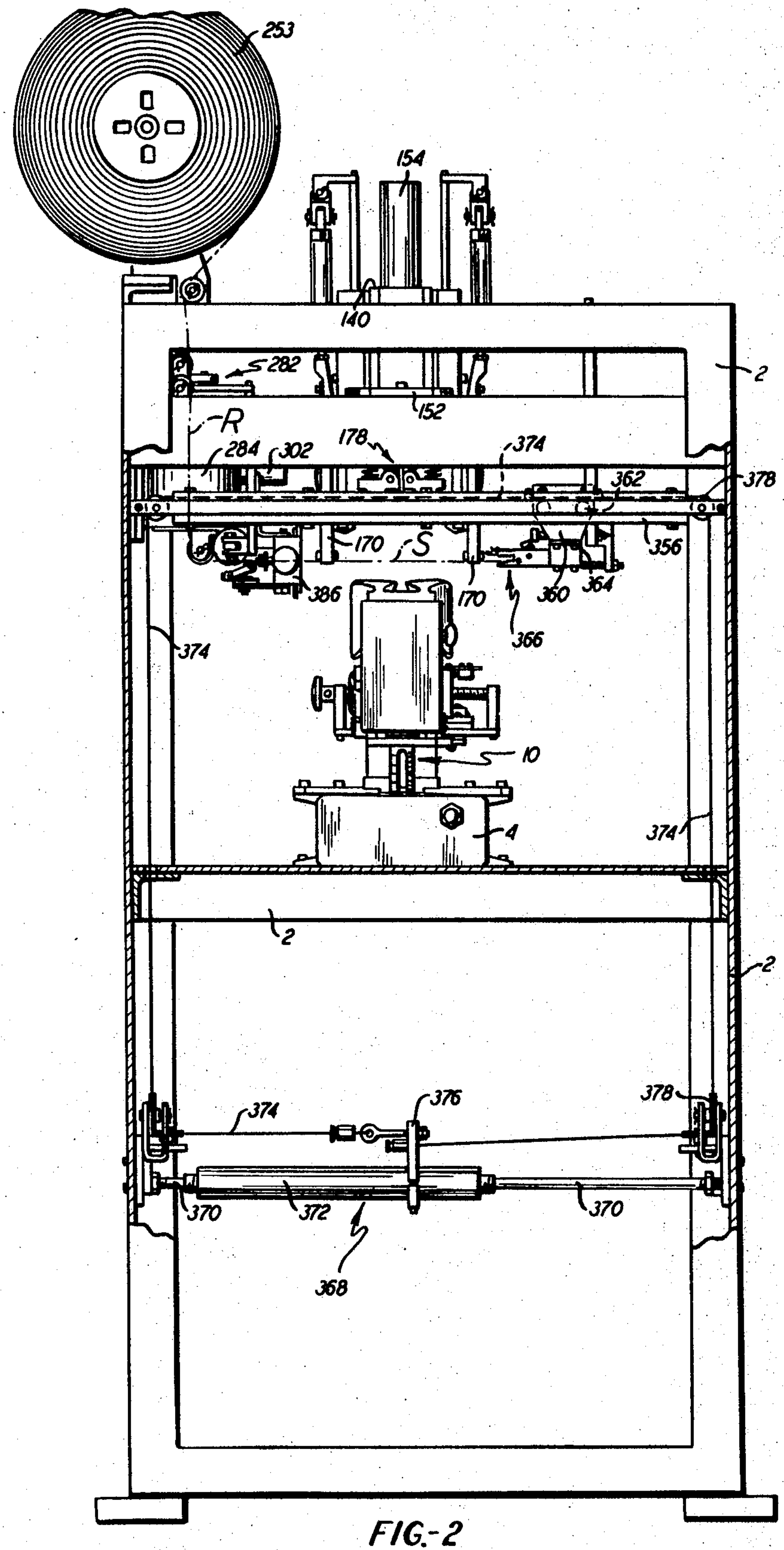
FIG. 2 is a side elevation of the machine as seen from the line 2—2 of FIG. 1.

In this specification the operator will be considered as being located at the front of the machine (to the right of the machine as shown in FIG. 2). Directions which are towards and away from the operator may be referred to as being forward and rearward respectively when the direction is in reference to the frame of the machine or laterally when the direction is in reference to the shoe assembly or the devices which support the shoe assembly. Inasmuch as the shoe assembly is supported in the machine in such a manner that its lengthwise dimension is disposed laterally with respect to the operator, a direction which is towards or away from the operator may be referred to as being forward-rearward and/or lateral, depending on whether reference is being made to the frame of the machine, shoe assembly, or both. Directions which extend substantially parallel to the lengthwise dimension of the shoe assembly (and thus laterally of the operator) will be referred to as being either heelward or toeward whether reference is being made to the workpiece or the frame of the machine, a direction extending from the operator's left to his right being referred to as toeward and a direction extending from the operator's right to his left being referred to as heelward.

Figure 1:
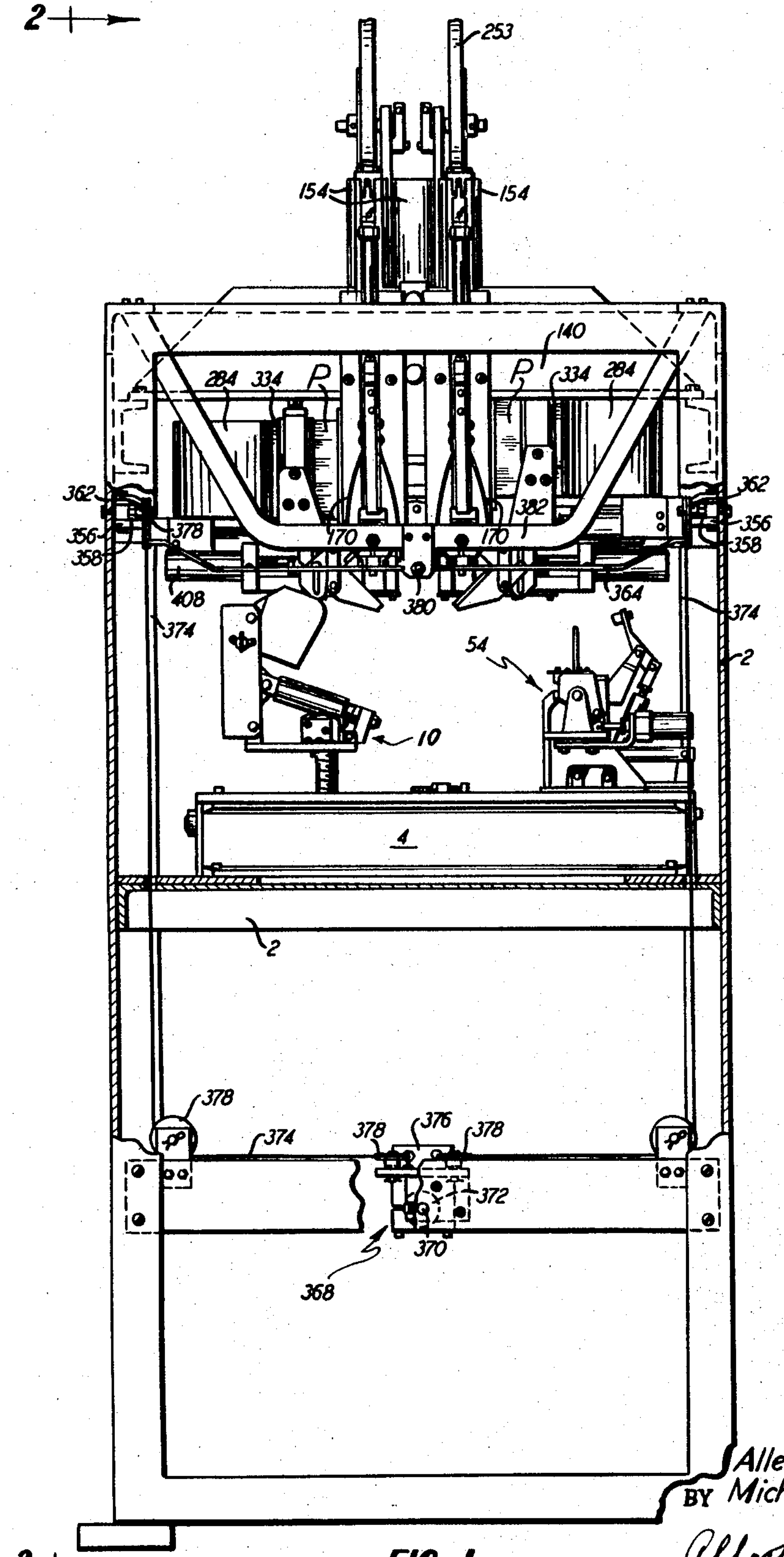
FIG. 1 is a front elevation of the machine.

Referring to FIGS. 1 and 2, the machine has a frame 2 to which a table 4 is secured. A heel supporting device 10 and a toe supporting device 54 are mounted to the table 4 for supporting and properly orienting the shoe assembly W in the machine. A channel 140 is secured to the frame 2 above the table 4 and extends in a paralleling heelward-toeward direction. Secured to the base 152 of the channel 140 is a bank of three heelwardly-toewardly aligned air actuated motors 154, the piston rods of which extend downwardly towards the table 4. Tape guides, in the form of downwardly extending bowed hangers 170, are mounted to the piston rods of the most heelward and toeward of the motors 154 for movement therewith. The hangers 170 act to support tape strips S by their side edges in such orientation that the tape strips extend above and laterally of the table 4. Pressing and insole molding devices 178 are also connected to the piston rods of each of the motors 154 for movement therewith.

Figure 7:
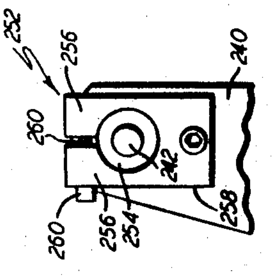
FIG. 7 is a side elevation of a tape roll braking device as viewed from the line 7—7 of FIG. 6.
Figure 6:
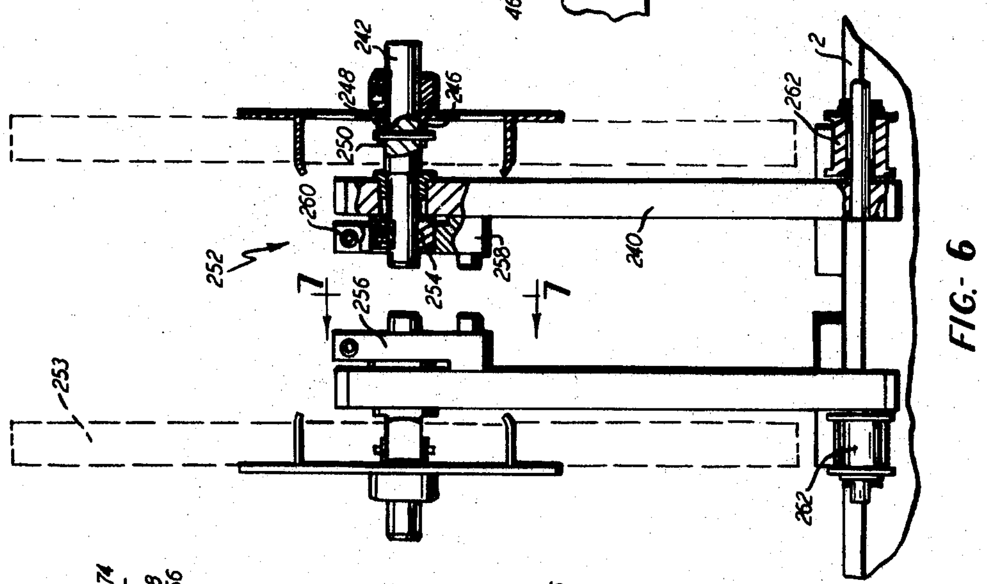
FIG. 6 is a front elevation, partly in section, of a tape roll supporting device.

Incorporated into the machine are mechanisms for fabricating the tape strips S, there being a toewardly located mechanism 236 (FIGS. 15 and 16) for fabricating the tape strip S which is to secure the ballbreak portion of the shoe assembly and a heelwardly located mechanism 238 for fabricating the tape strip S which is to secure the breastline portion of the shoe assembly. Both mechanisms are located upwardly and laterally rearward of the table 4. Inasmuch as both mechanisms 236, 238 are of substantially identical construction and operation only the toewardly located mechanism 236 will be described. It should be noted that in the illustrative embodiment of the invention, although the toewardly located and heelwardly located tape strip fabricating mechanisms 236, 238 are of substantially identical construction, the heelward-toeward directions of components and motions thereof are reversed. Thus when a component of the toewardly located tape strip fabricating mechanism 236 is described as extending or having motion in a heelward direction, the corresponding component of the heelwardly located tape strip fabricating mechanism 238 will extend or have motion in a toeward direction. Similarly when a component of the toewardly located tape strip fabricating mechanism 236 is described as extending or having motion in a toeward direction, the corresponding component of the heelwardly located tape strip fabricating mechanism 238 will extend or have motion in a heelward direction. Referring to FIG. 6 the mechanism has an upwardly extending tape roll support 240 mounted to the frame 2 laterally of the channel 140. A spindle 242 is journaled at a point intermediate its ends to the upper end of the support 240 and has a disc-shaped tape roll holder 244 detachably mounted to one end thereof. The disc 244 has a hub 246 adapted to fit on the spindle 242, rotation of the hub 246 on the spindle 242 being precluded by means of engagement of a pin 248 which projects diametrally from the spindle 242 with a pair of mating slots 250 in the hub 246. The other end of the spindle 242 is in engagement with a braking device 252 (see also FIG. 7) which is adapted to frictionally retard the rotation of the spindle 242 thus insuring that as the tape is stripped from the roll 253 it will remain relatively taut. The braking device 252 consists of a drum 254 which is secured to the other end of the spindle 242 and which is rotatable between the jaws 256 of a braking block 258. The degree of braking which is exerted on the spindle 242 may be varied by tightening or loosening the jaws 256, there being a bolt 260 provided for this purpose.

Figures 12, 13, 14:
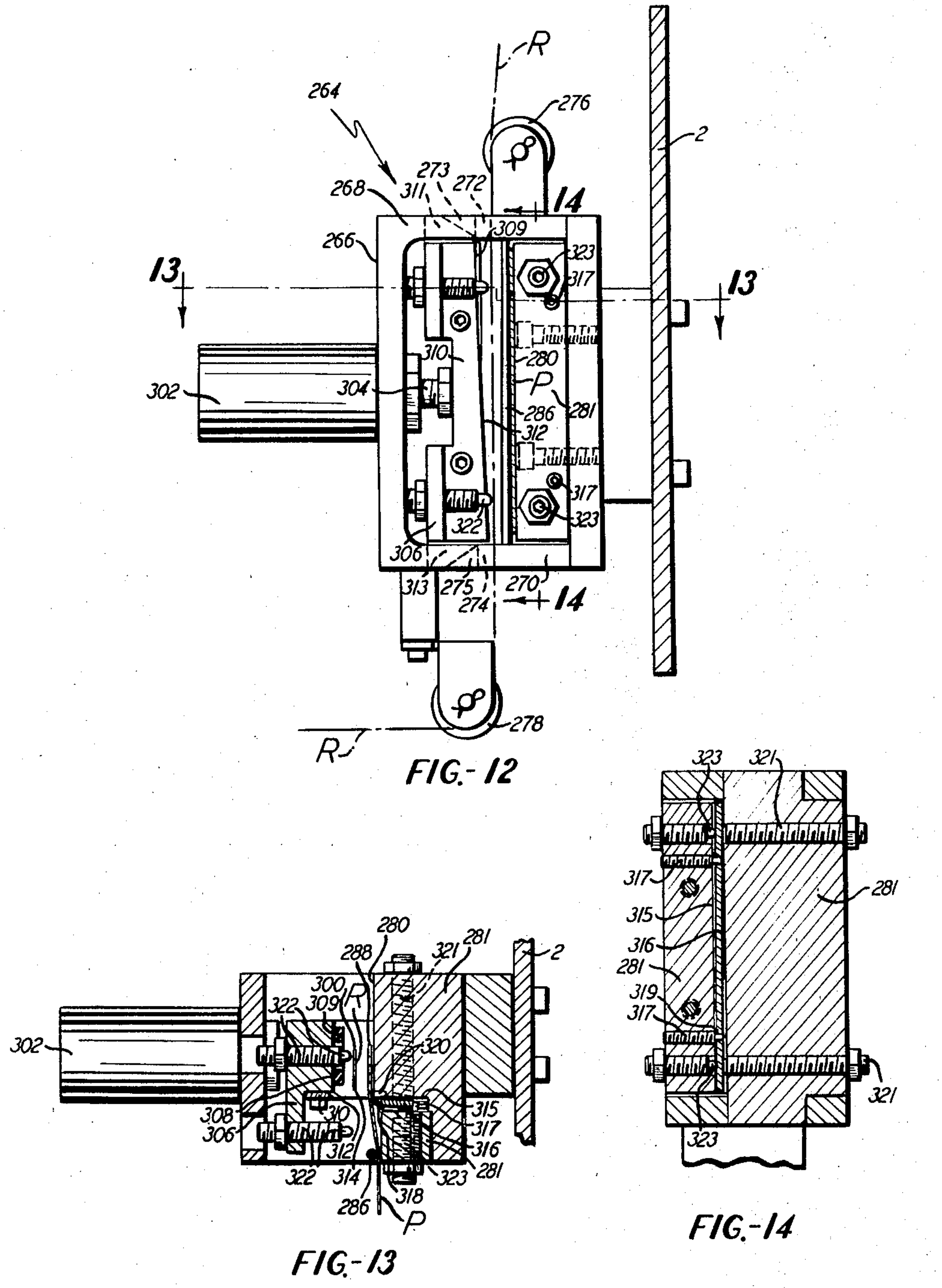
FIG. 12 is a side elevation of a backing strip applying device as viewed from the line 12—12 of FIG. 16.
FIG. 13 is a sectional view of the backing strip applying device taken along the line 13—13 of FIG. 12.
FIG. 14 is a section taken on the line 14—14 of FIG. 12.
Figure 15:
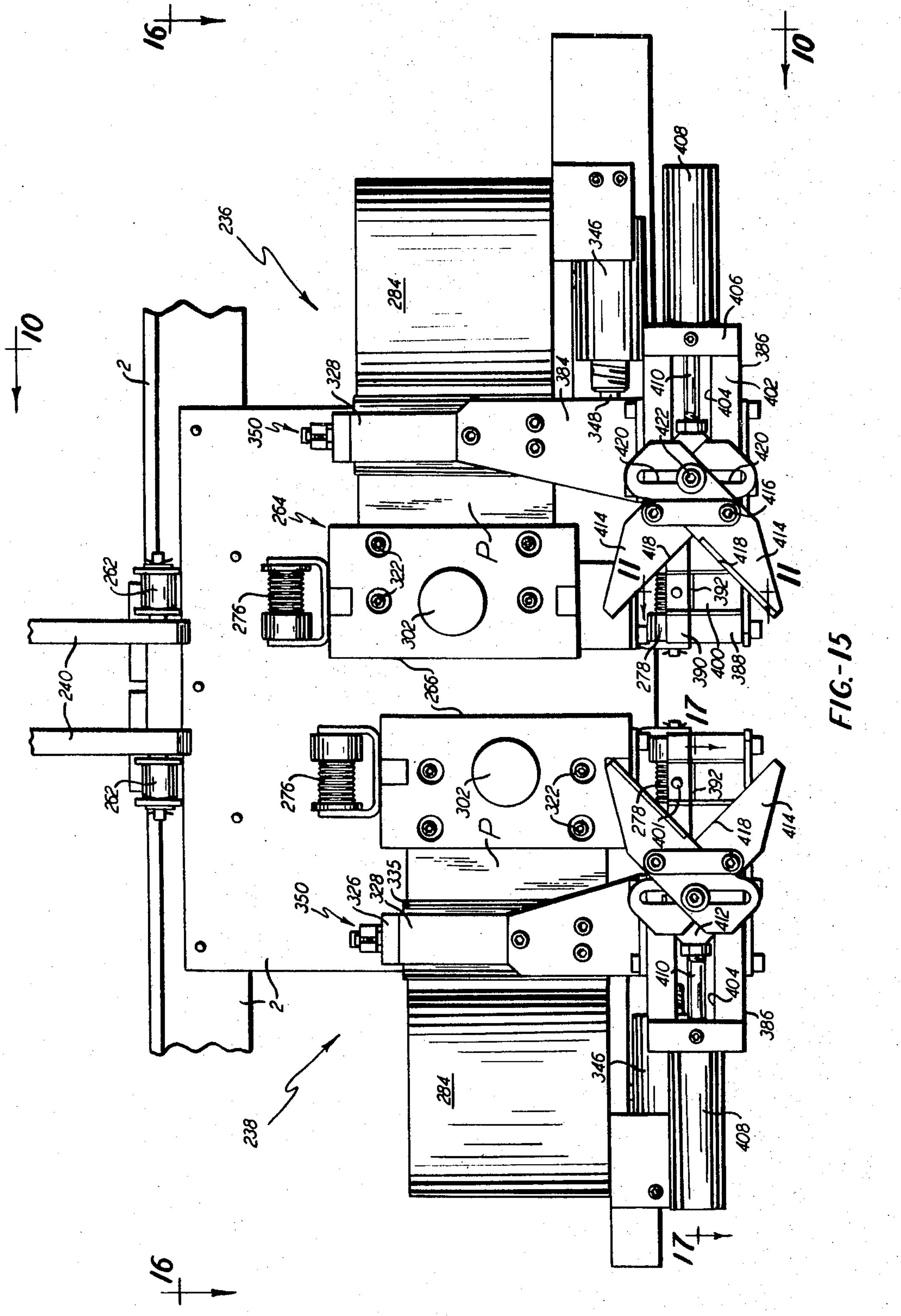
FIG. 15 is a front elevation of the tape strip fabricating mechanism.

Referring to FIG. 15, as the tape T is stripped from the roll 253 it is pulled (by a device later described) downwardly past a guide roller 262, and into a paper applying device 264 which fabricates a paper backing strip B of at least the same width as the tape and affixes it to the adhesive side of the tape T so that that portion of the tape may no longer present an exposed adhesive surface. As shown in FIGS. 12, 13 and 14, the paper applying device 264 includes a housing 266 which is secured to the frame 2 and is located below the tape roll. The upper and lower walls 268, 270 of the housing have slots 272, 274 formed therein which are adapted to permit the tape ribbon R to pass through the housing in a vertically downward direction. The backing strip B is affixed to the tape as it passes through the housing 266 by a device therefor which is contained in the housing 266. The tape is guided through the slots 272, 274 in the housing 266 by guide rollers 276, 278 which are mounted to the housing 266 adjacent the slots 272, 274, the rollers 276, 278 being effective to dispose the tape R within the housing 266 in such a manner that the adhesive surface of the tape faces and is spaced in substantially paralleling relationship from the interior anvil surface 280 of the housing wall 281.

A paper-feeding device 282 later described is mounted to the frame 2 toewardly of the housing 266 and is operative to periodically feed paper P from a roll 284 in a horizontally heelward direction and into the open, toeward end of the housing 266 (see FIGS. 10, 15 and 16). A vertical pin 286 is mounted to the forward, open end of the housing 266 adjacent the anvil 280 and serves to guide the leading edge 288 of the paper P so that it may be properly interposed between the adhesive surface of the tape ribbon R and the anvil 280. The paper feeding device 282 feeds the paper P an amount corresponding to at least the width of the tape so that the leading edge 288 of the paper will extend at least to the heelward edge 300 of the tape after the feeding has been effected.

An air actuated motor 302 is mounted to the housing 266 in such a manner that the piston rod 304 thereof is movable towards and away from the anvil 280, there being a hammer 306 secured to the end of the piston rod 304. The hammer 306 has a vertical face 308 which lies in a plane paralleling the anvil 280 and is located in alignment with the superposed tape R and paper end so that upon actuation of the motor 302 to move the hammer 306 towards the anvil 280 the tape R and paper P may become pressed therebetween to cause the paper to firmly adhere to the tape. The face 308 of the hammer 306 may be covered with a sheet 309 formed from a resilient, compressible material such as rubber.

The upper and lower ends of the hammer 306 have lugs 311, 313 formed thereon which extend respectively into forwardly-rearwardly disposed slots 273, 275 formed in the upper and lower walls 268, 270 to thereby maintain the hammer 306 in its vertical disposition in its movement towards the anvil 280 (see FIG. 12).

For the purpose of severing the backing strip portion from the remainder of the roll of paper a knife 310 having a heightwise disposed cutting edge 312 is secured to the hammer 306 so that its cutting edge 312 is located opposite the toeward edge 314 of the tape. Another knife 316 is supported within the wall 281 and has a heightwise disposed cutting edge 318 projecting beyond the surface of the anvil 280 and towards the cutting edge 312 of the knife 310. The knives 310, 316 are cooperative to sever that portion of the paper P which has adhered to the tape from the remainder of the roll of paper. Referring to FIGS. 12, 13 and 14, it may be seen that the cutting edge 312 of the knife 310 is disposed at a slight incline to the vertical and to the cutting edge 318 of the knife 316 so that the initial engagement of the knives 310, 316 occurs at the bottom portions thereof, the effect of which is to provide a clean cutting stroke and insuring that the paper P will be sharply and neatly severed. The cutting stroke of the knives 310, 316 will thus progressively proceed upwardly from the bottom of the paper P to the top thereof. The stationary knife is mounted to the wall 281 in such a manner that the cutting edges 312, 318 do not engage each other until after the lowermost portion of the cutting edge 312 has been moved rearwardly beyond and has crossed but not contacted the lowermost portion of the cutting edge 318, thus insuring that when the knives 310, 316 ultimately do engage each other, they will be in proper position with respect to each other to effect the aforementioned cutting stroke. The stationary knife 316 is contained in a slot 315 formed in the wall 281, the slot 315 being greater in width than the thickness of the knife 316 so that the knife 316 may have a limited degree of freedom therein. Mounted to the wall 281 and extending into the slot 315, in a direction which is substantially normal to the plane of the knife 316, are a pair of vertically spaced locating pins 317, the ends of which are contained in similarly spaced holes 319 formed in the knife 316, thus precluding any substantial movement of the knife 316 within the slot 315 in a direction other than a heelward-toeward one. For the purpose of adjusting the disposition of the knife 316 in the slot 315 a pair of vertically spaced stop bolts 321 are threaded into one side of the wall 281 such that one end of each thereof extends into the slot 315 in a direction that is substantially normal to the plane of the stationary knife 316. The extent that the stop bolts 321 extend into the slot 315 may be varied by simply rotating them. Mounted to the other side of the wall 281 for movement towards and away from the knife 316 in axial alignment with the stop bolts 321 are a pair of vertically spaced pins 323 which are biased towards and extend into the slot 315. The pins 323 and stop bolts 321 are cooperative to grip the knife 316 therebetween, with the orientation of the knife 316 within the slot 315 being governed by the extent to which each stop bolt 321 extends into the slot 315, the biased pins 323 being effective at all times to maintain the knife 316 in abutment with the stop bolts 321. It may thus be seen that when the lower of the stop bolts 321 extends into the slot 315 a greater amount than the upper stop bolt 321, the knife will be so disposed that cutting edge 318 thereof will be askew with respect to the cutting edge 312 of the knife 310, with the lowermost portion of the cutting edge 318 being spaced toewardly of the lowermost portion of the cutting edge 312. Inasmuch as the knives 310, 316 respectively extend beyond the surfaces 308, 280, a cutout 320 is provided in the wall 281 to accommodate the protruding knife 310 thereby permitting the surfaces 308, 280 to effectively press the tape and the paper together.

In order to hold the tape R and the paper P in a steady and fixed position during the cutting operation, a pair of vertically spaced pins 322 are moveably mounted to the hammer 306 on each side of the knife 310 and extend towards the anvil 280. The pins 322 extend a greater distance towards the wall 281 than the knife 310 so that as the motor 302 is actuated to move the hammer 306 towards the superposed tape and paper the ends of the pins 322 may serve to press the paper and tape against the interior surface of the wall 281, thereby maintaining them in proper position for the subsequent cutting and pressing operation. The pins 322 are resiliently biased towards the wall 281 so that the knife 310 and hammer 306 may continue to move towards the tape and paper under influence of the motor 302, with the pins 322 being effective to maintain the paper and the tape in proper position. Such pins or spring plungers are commercially available from Northwestern Tools, Inc., Dayton, Ohio.

Figure 16:
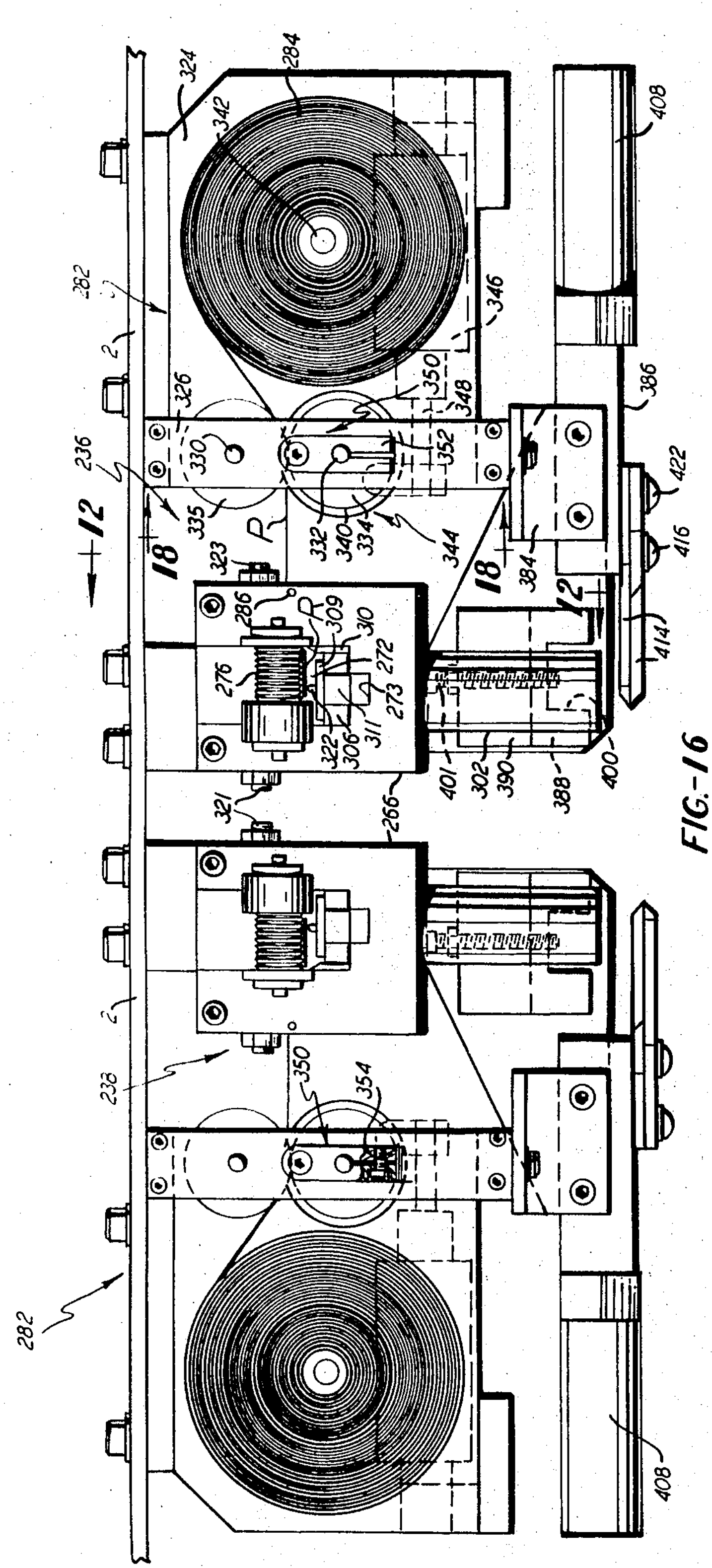
FIG. 16 is a plan view of the tape strip fabricating mechanisms taken on the line 16—16 of FIG. 15.
Figure 18:
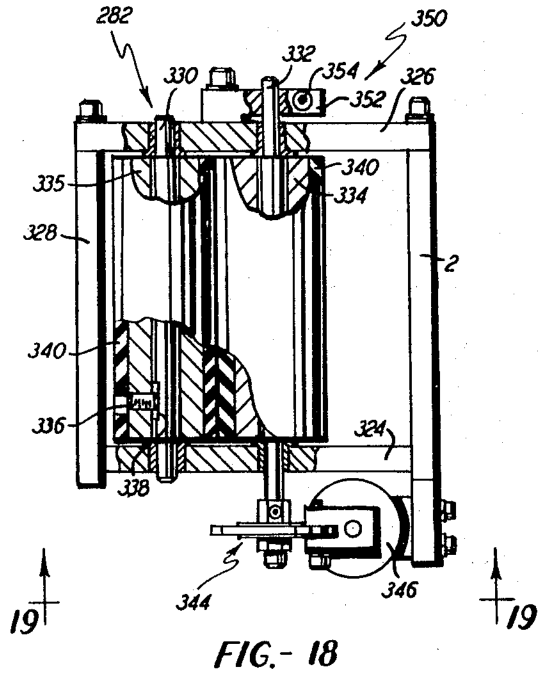
FIG. 18 is a side elevation, partly broken away, of a paper ribbon feeding mechanism, with the paper roll removed, taken along line 18—18 of FIG. 16.
Figure 19:
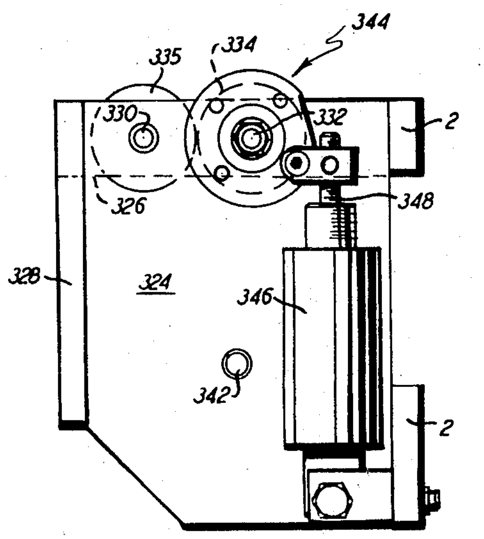
FIG. 19 is a view of the underside of the paper ribbon feeding mechanism taken along the line 19—19 of FIG. 18.

Referring to FIGS. 16, 18 and 19, the paper feeding mechanism 282 is located forwardly of the housing 266 and has a horizontal base plate 324 secured to and extending inwardly from the frame 2. Spaced above the base plate 324 and similarly secured to the frame 2 is an inwardly extending beam 326. The inwardly extending ends of both the beam 326 and the base plate 324 are joined by a vertical brace 328 which serves to more effectively rigidify the base plate 324, the beam 326 and the components mounted thereto. A pair of vertical, laterally spaced spindles 330, 332 are rotatably journaled, at their ends, to the base plate 324 and the beam 326. A drive roller 334 and an idler roller 335 are coaxially secured to the spindles 332, 330 respectively by means of set screws 336 and cooperative flat surfaces 338 formed on each of the spindles 330, 332. The peripheral surface 340 of each of the rollers 334, 335 is fabricated from rubber or other resilient material having a relatively high coefficient of friction. The dimensions of the aforementioned arrangement are such that the outer peripheries of each of the rubber surfaced rollers 334, 335 may be in continuous tangential contact with each other so that as the drive roller 334 is rotated, the idler roller 335 may rotate therewith. The resiliency and coefficient of friction of the peripheral surface 340 of the rollers 334, 335 is such that the paper P may be positively gripped therebetween and be fed heelwardly thereby into the toeward open end of the housing 266 upon rotation of the drive rollers 334. The roll 284 of non-adhesive paper P is supported on the base plate 324 (see FIGS. 10 and 16) toewardly of the rollers 334, 335, there being a pin 342 extending upwardly from the base plate 324 about which the roll 284 may be placed.

The spindle 332 has its ends protruding upwardly beyond the beam 326 and downwardly beyond the base plate 324. A one-way rotary clutch 344 is mounted to the downwardly protruding end of the inner spindle 322. The clutch 344 is driven by means of an air actuated motor 346 which is pivotally mounted to the frame 2 and has a rearwardly extending piston rod 348 which is operatively connected to the clutch 344. The clutch 344 is of such construction that as the motor 346 is actuated to cause the piston rod 348 to move heelwardly, the clutch 344 will slip so that no motion will be imparted to the drive roller 334, but as the motor 346 is actuated to cause the piston rod 348 to move toewardly the clutch may lock thereby causing rotation of the drive roller 334 (in a clockwise direction as seen in FIG. 19). It may thus be seen this drive mechanism is effective to periodically feed the paper P which has been introduced between the rollers 334, 335 in a heelward direction. The dimensions of the clutch 344 and the stroke of the piston rod 348 are such that each forward stroke of the piston rod 348 will cause the rollers 334, 335 to advance the leading edge 288 of the paper P an amount equal to at least the width of the tape R. A clutch of the tape described is commerically available from Warren M. Pike Associates, Boston, Mass.

A frictional brake 350 is mounted on the beam 326 and is in engagement with the upwardly protruding end of the spindle 332. It is operative to provide a sufficient amount of drag on the spindle 332 to preclude rotation of the spindle except when the motor 346 is actuated. The frictional brake 350 is a fork-like member having a pair of tines 352 which embrace the upper end of the spindle 332 and which may be drawn together to bear against the spindle end. A bolt 354, rotatable within the end of one of the tines and in threaded engagement with the end of the other tines, is provided for this purpose.

Figures 3, 4, 5:
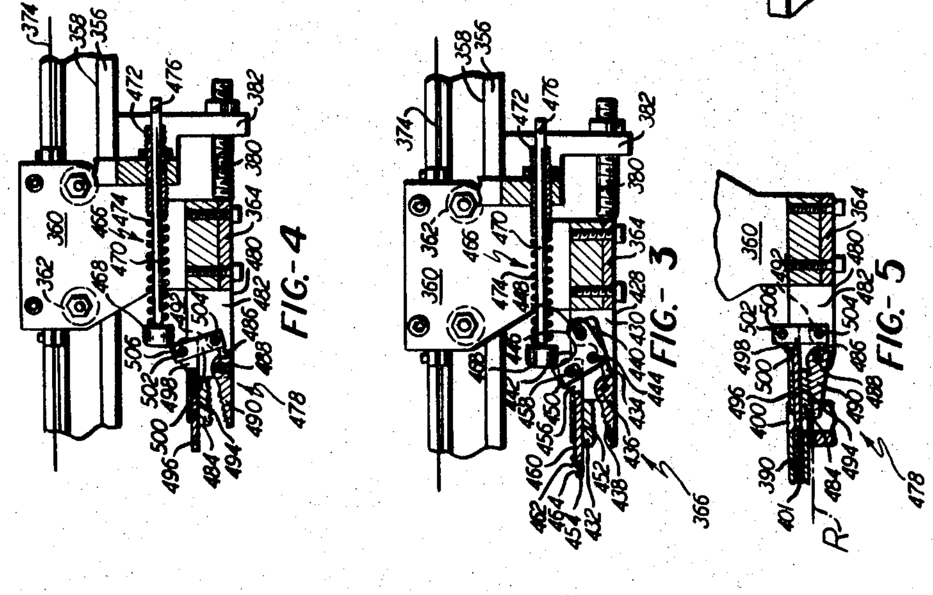
FIG. 3 is a sectional view of the pincers jaws in an open, deactivated condition taken along the line 3—3 of FIG. 9.
FIG. 4 is a sectional view of an alternative pincers jaws in an open, deactivated condition similar to that illustrated in FIG. 3.
FIG. 5 is a sectional view of the alternate pincers jaws just after it has been actuated to a closed and locked position.

As mentioned earlier, a tape advancing mechanism is provided which is operative to pull the free end of the tape ribbon R so that the tape strip S portion thereof may be properly positioned with respect to the shoe assembly and a fresh portion of the tape ribbon R may be stripped from the tape roll 253 and drawn downwardly into the housing 266 in which a backing strip B may be applied. Referring to FIGS. 1, 2 and 3 a pair of laterally extending runners 356, on which this mechanism is moveably mounted, are mounted to the frame 2, one runner 356 being at the toeward end of the frame 2 and the other runner 356 being at the heelward end of the frame 2. Each runner 356 has a channel 358 formed lengthwise therein. A trolley 360 is moveably mounted to each of the runners 356 by means of rollers 362 which are rotatably mounted to the trolleys 360 and are contained within the channels 358. A support bar 364 extends in a heelward-toeward direction and is suspended at its ends from the trolleys 360 so that it may move, together with the trolleys 360, laterally over the table 4 in a forward-rearward direction which is towards and away from the tape strip fabricating mechanisms 236, 238. Mounted to the support bar 364 are a pair of pincer jaws 366 (FIG. 3), there being one pincer jaws 366 associated with each tape strip fabricating mechanism 236, 238. The pincer jaws 366 are so positioned in the machine and with respect to the free ends of the tapes that when the trolleys 360 have carried the pincer jaws 366 to the tape strip fabricating mechanisms the pincer jaws 366 may be closed to grip the free ends of the tape R whereupon the trolleys 360 may be moved to carry the pincer jaws 366 laterally across the table to their original remote, forward position thereby advancing the tape to a position wherein the leading tape strip S portion thereof is spaced laterally above the table 4 and a portion of tape which has been freshly stripped from the tape roll 253 is contained within the housing 266 in readiness for application of a backing strip B thereto.

The aforesaid movement of the trolleys 360 and pincer jaws 366 carried thereby is effected by means of an air actuated motor 368 which has a stationary piston rod 370 and a cylinder 372. The piston rod 370 is of greater length than the cylinder 372 and extends outwardly of both ends thereof, the extending ends of the piston rod 370 being secured to the frame 2 so that when the motor 368 is actuated the cylinder 372 thereof may move laterally and along the piston rod 370. The movement of the motor 368 is transmitted to the trolleys 360 by means of cables 374 to which the trolleys 360 are securely clamped, the ends of each cable 374 being secured to a bracket 376 mounted to the movable cylinder 372 of the motor 368. Pulleys 378 are rotatably mounted to the frame 2 and are so arranged as to guide the cables 374 in a path such that as the motor 368 is actuated to move the cylinder 372 forwardly, the trolleys 360, support bar 364 and pincer jaws 366 carried thereon may move rearwardly across the table 4 and towards the tape strip forming mechanisms. Similarly when the motor 368 is actuated to move the cylinder 372 rearwardly the pincer jaws 366 will move laterally across the table 4 in a forward direction which is away from the tape strip forming mechanisms. The extent that the pincer jaws 366 may travel away from the tape strip forming mechanisms is governed by an adjustable stop bolt 380 which is threaded into a support bracket 382 that is in turn secured to the frame 2. The stop bolt 380 is positioned so as to be in the plane of movement of and extending towards the support bar 364.

Figures 8, 10, 11:
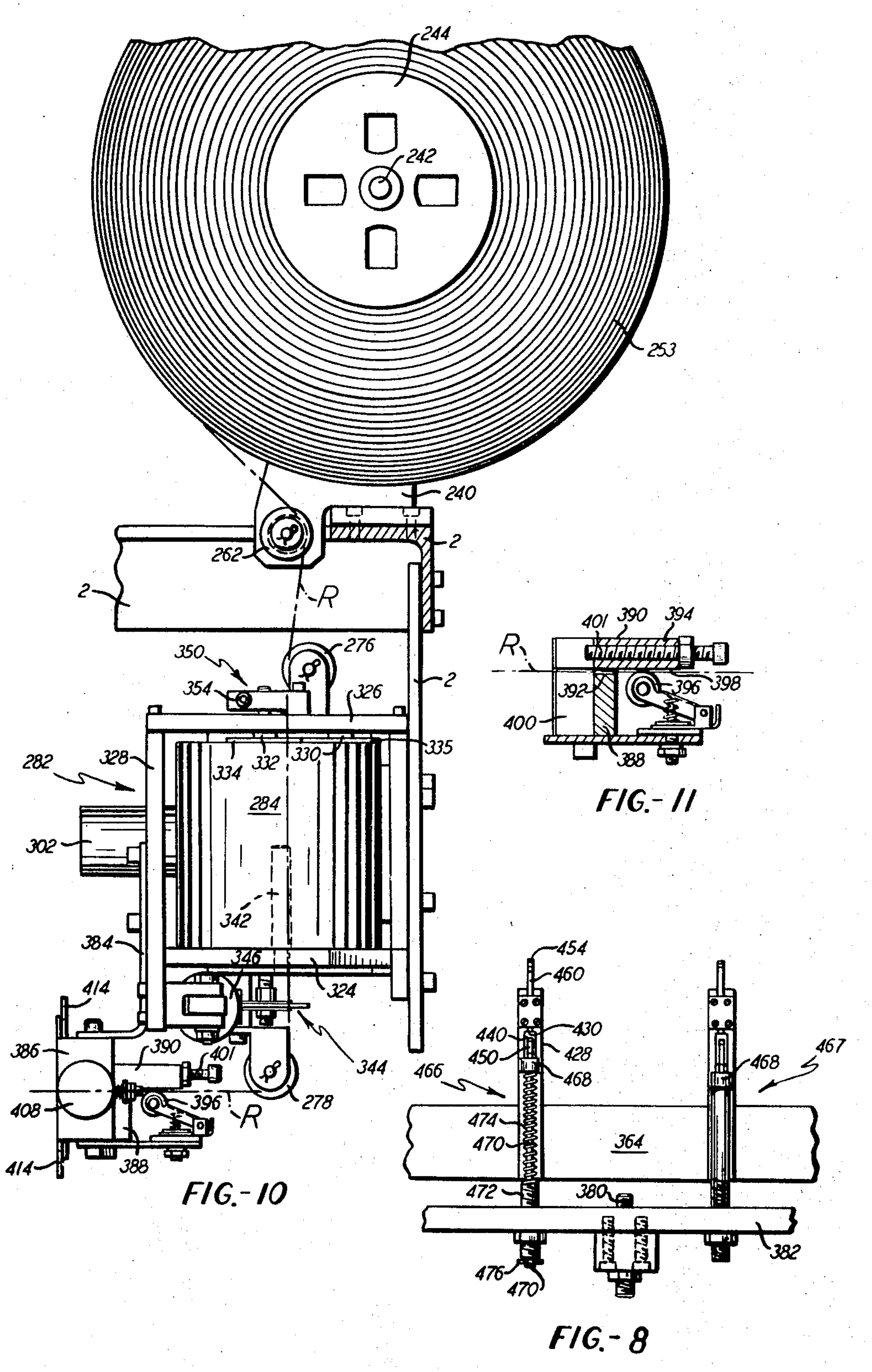
FIG. 10 is a side elevation of a tape strip fabricating mechanism as viewed from the line 10—10 of FIG. 15.
FIG. 11 is a sectional view of a tape guide block taken along the line 11—11 of FIG. 15.

Referring to FIGS. 2 and 10, a bracket 384 is secured to and extends inwardly from the housing 266. Depending from the bracket 384 is a scissor frame 386 which is an integral part of a cutting mechanism (later described in detail) that functions to sever the tape strips S from the tape roll 253 after the backing strips B have been affixed thereto. Mounted to and heelwardly and rearwardly of the scissor frame 386 is a tape guide block 388 having a cap 390 secured to the upper surface thereof (see FIG. 11). A groove is formed laterally in the upper surface of the block 388 thus providing a passageway 392 between the guide block 388 and the cap 390, the passageway 392 being of slightly greater width than the tape so that the tape may pass therethrough. The aforementioned members are arranged such that the passageway 392 is in alignment with the bottom of the guide roller 278 so that the passageway 392 and the guide roller 278 may cooperate to guide the tape horizontally forward from the housing 266. The cap 390 has an overhanging portion 394 extending towards the guide roller 278 and an idler 396 is biased upwardly against the bottom surface 398 of the overhanging portion 394 to maintain the tape R which is interposed therebetween in a taut condition. A vertical slot 400 is formed at the inward end of the combined tape guide block 388 and cap 390 and a stop bolt 401 is threaded through the cap 390 so that its end extends into the slot 400 for a purpose later described.

Figure 17:
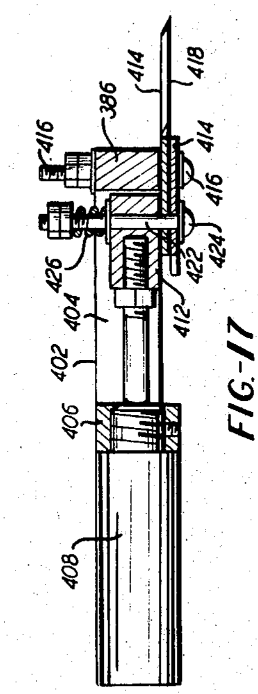
FIG. 17 is a sectional view of a tape ribbon cutting mechanism taken along the line 17—17 of FIG. 15.

Referring to FIGS. 15 and 17, the scissors frame 386 is U-shaped, having its legs 402 extending in a toeward direction and defining a guideway 404 therebetween. A bar 406 is secured to the free ends of the legs 402 of the scissors frame 386 and an air actuated motor 408, having its piston rod 410 extending heelwardly between the legs 402 of the scissors frame 386, is secured to the bar 406. A scissors slide 412 is secured to the end of the piston rod 410 and is slidably contained within the guideway 404. Located at the side of the heelward end of the scissors frame 386 are a pair of scissors blades 414 which are pivotally mounted thereto by means of vertically spaced pivot pins 416 so that each of the scissor blades 414 may pivot, at a point intermediate its ends, about its associated but separate pin 416. The effect of so spacing the pivots 416 is that as the scissor blades are pivoted towards each other the cutting edges 418 thereof may cooperate to effect a quicker and more precise drawcut stroke. The pivotal motion of the scissor blades 414 is effected by means of a slot 420 formed in a non-cutting end of each of the scissor blades 414. A pin 422, mounted to the scissor slide 412, extends laterally through the slot 420 of each scissor blade 414. The slots 420 are formed at an incline in such a manner as to cause the scissor blades 414 to be pivoted towards each other in a cutting stroke when the scissor slide 412 and pin 422 are moved towards the motor 408 in response to actuation thereof and to thereafter cause the scissor blades 414 to be pivoted away from each other so as to open in response to actuation of the motor 408 to move the scissor slide 412 and pin 422 away from the motor 408. The pin 422 has a head 424 formed thereon for the purpose of retaining the pin 422 in the slots 420. The pin 422 is biased by means of a compression spring 426 to continually press the scissor blades 414 into abutment with each other thus insuring that the cutting edges 418 thereof will always be in contact with each other. The scissor frame 386 and scissor blades 414 are so arranged that the blades 414 pivot in a vertical plane which is located forwardly of the tape guide block 388 and so that the continually advancing intersection of the cutting edges defines a locus which substantially coincides with the horizontal plane of the tape strip S. The dimensions of the scissor blades 414 and drive mechanism therefor are such that when the blades 414 are in an open, non-cutting position, the cutting edges 418 may be sufficiently spaced as to permit the pincers jaws 366 to pass therebetween.

Referring now to FIG. 3, each pincer jaws 366 includes a pincer housing 428 which is rigidly mounted to the support bar 364 and extends therefrom towards the tape strip fabricating mechanism. The pincer housing 428 has an enlarged vertical slot 430 formed therein and a fixed upper jaw 432 formed at its extending end. An arm 434 is pivotally mounted at its midportion in the pincer housing 428 by means of a pivot pin 436 in such a manner that one end of the arm 434 is contained within the slot 430 and the other end of the arm 434 extends outwardly of the pincer housing 428 and below the fixed upper jaw 432. The outwardly extending end of the arm is formed into a lower jaw 438 and the inwardly extending end of the arm 434 is formed into a clevis 440. A bellcrank 442 is pivotally mounted to the pincer housing 428 interiorally thereof by means of a pin 444 and has one leg 446 thereof pivotally connected to the clevis 440 by a pin 448. The other leg 450 of the bellcrank 442 extends upwardly and out of the slot 430. Formed along the upper surface of the extending end of the pincers housing 428 is a guideway 452 in which an actuating slide 454 is slidably contained. One end of the actuating slide 454 is contained interiorally of the pincer housing 428 and the other end of the actuating slide 454 protrudes beyond the end of the upper jaw 432. The end of the actuating slide 454 which is contained within the pincers housing 428 is formed into a clevis 456 which embraces the upwardly extending leg 450 of the bellcrank 442 and is pivotally connected thereto by means of a pin 458. It may thus be seen that when the protruding end of the actuating slide is urged forwardly towards the pincers housing 428, the bellcrank 442 will pivot rearwardly (clockwise as seen in FIG. 3) away from the fixed upper jaw 432 to thereby close the pincers 366.

In the operation of the machine it is desirable to lock the pincers 366 in their closed position to prevent the tape gripped therein from slipping from the jaws. For this purpose a flat leaf spring 460 is secured to the upper surface of the pincers housing 428 and extends beyond the end of the fixed upper jaw 432. The end of the leaf spring 460 is formed into a hook 462 and a cut-out 464 of shape corresponding to that of the hook 462 is formed in the outer end of the actuating slide 454 so that as the actuating slide 454 is urged forwardly into the pincers housing 428 to thereby close the pincers jaws 366, the hook 462 may be urged into the cut-out 464 by the resiliency of the leaf spring 460 thereby maintaining the jaws 366 in a closed position.

The machine is so constructed that as the support bar 364 is moved to carry the pincer jaws 366 towards and away from the tape strip fabricating mechanisms 236, 238, the pincers jaws 366 may move between the tape guide hangers 170, between the open blades 414 and into the vertical slot 400 of the tape guide block 388 where the free end of the tape ribbon R is located. When the pincers jaws are carried into the slot 400 the protruding end of the activating slide 454 abuts the tape guide block 388 so that the continued rearward movement of the support bar 364 and pincers housing 428 may cause the pincers jaws 366 to close and grip the end of the tape ribbon R, the pincer jaws 366 becoming locked by means of the hooked leaf spring 460. The support bar 364 and pincers jaws 366 may then be moved forwardly away from the tape strip fabricating mechanisms 236 and 238, thus drawing the tape ribbon therewith such that the tape strip portion S thereof is spaced above and disposed transversely of the shoe assembly and a fresh, trailing portion of the tape ribbon R is contained within each tape strip fabricating mechanism.

Figure 9:
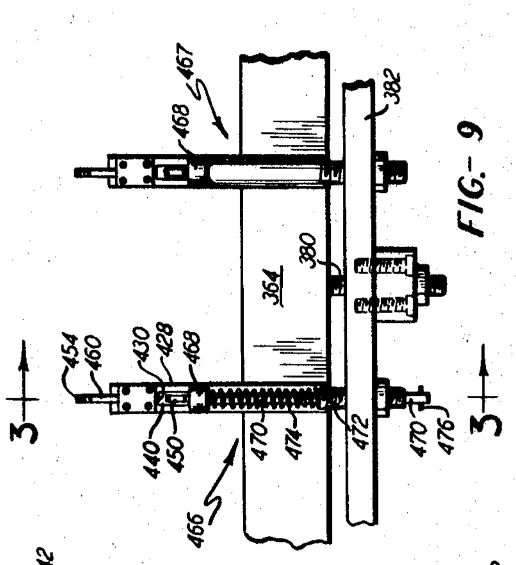
FIGS. 8 and 9 are views of pincers deactivators and pincers jaws.

When the tape ribbon R has been drawn forwardly the desired amount and to the desired position the pincers jaws 366 are caused to open thus releasing the tape ribbon R and terminating its withdrawal. Referring to FIGS. 3, 8 and 9, pincers deactivators 466, 467 are secured to the support bracket 382 and extend rearwardly towards their associated pincers jaws 366. Each of the pincers deactivators 466, 467, has an abutting end 468 which is adapted to be abutted by the upwardly extending leg 450 of the bellcrank 442 as the pincers jaws 366 is drawn forwardly, thus causing the leg 446 of the bellcrank 442 to pivot upwardly to thereby pivot the lower jaw 438 downwardly and release the tape ribbon.

It may be seen that in the illustrative embodiment of the invention, the tape strip S which is to be applied to the breastline portion of the shoe assembly need not be as long as that which is to be applied to the ballbreak portion of the shoe assembly, due to the greater width of the shoe assembly at the ballbreak portion than at the breastline portion thereof. The apparatus herein disclosed is operative to fabricate such tape strips of different lengths by causing each of the pincers jaws 366 to release its grip on its associated tape ribbon R when the desired amount of tape ribbon has been withdrawn. As shown in FIGS. 3, 8 and 9, the abutting end 468 of the breastline pincers deactivator 466 extends rearwardly towards its associated pincers jaws 366 a greater amount than the abutting end 468 of the ballbreak pincers deactivator 467 so that as the support bar 364 draws the pincers jaws 366 forwardly in unison, the more rearwardly extending breastline pincers deactivator 466 will cause its associated pincers jaws 366 to open and release the tape ribbon R gripped therein. The pincers deactivator 466 is constructed in a manner described below so as to permit the support bar 364 to continue its forward movement and thus carry the other pincers jaws 366 forwardly therewith, thereby continuing to draw the tape ribbon R gripped therein to a greater length, until that pincers jaws 366 is carried into abutment with the ballbreak pincers deactivator 467 whereupon the upwardly extending leg 450 of the bellcrank 442 may abut the end 468 of the ballbreak pincers deactivator 467, thus causing the leg 446 of the bellcrank 442 to pivot upwardly to thereby pivot the lower jaw 438 downwardly and release the tape ribbon.

As illustrated in FIGS. 3, 8 and 9, the breastline pincers deactivator 466 includes a rod 470 which is contained in a bushing 472, the bushing 472 being secured to the support bracket 382. The rod 470 extends rearwardly towards the tape strip fabricating mechanism 238 and is slidable within the bushing 472 in a forward-rearward direction. The abutting end 468 of the pincers deactivator 466 is located at the rearwardly extending end of the rod 470 with a compression coil spring 474 being interposed between the bushing 472 and the abutting end 468 and surrounding the rod 470. The spring 474 is effective to bias the rod 470 in its rearwardmost position and is of such strength as to substantially maintain the rod 470 in its rearwardly extended position while the engagement therewith of the upwardly extending leg 450 of the bellcrank 442 causes the pincers jaws 366 to open and to thereafter yield forwardly so as to permit the support bar 364 to bring the other pincers jaws 366 into engagement with the ballbreak pincers deactivator 467 to thereby open the other pincers jaws 366. A retaining pin 476 may be secured to the forward end of the rod 470 to maintain the rod 470 within the bushing 472. Inasmuch as there is no more need for forward travel of the support bar 364 and the pincers jaws 366 after the breastline pincers deactivator 467 has caused its associated pincer jaws 366 to release the tape ribbon R, the breastline pincers deactivator 467 may be a simple bolt.

After the tape ribbons R have been drawn to their desired respective lengths and are supported in the tape guide hangers 170 over the shoe assembly, the scissor blades 414 may be activated to sever the tape strip portions S from the tape ribbons R. It should be noted that when the tape ribbon R is withdrawn a lesser amount to thus provide a shorter tape strip S the positioning of the scissor blades 414 must be moved forwardly along the path of travel of the tape ribbon R so that the ends of the tape strip S which is severed therefrom will extend an equal amount beyond the edge of the bottom of the shoe assembly. Furthermore, when the tape strip S is to be of shorter length the backing strips B must be applied to the tape ribbon R at a location along the path of travel thereof which is closer to the cutting plane of the scissor blades 414. As illustrated in FIG. 15, the heelward tape strip fabricating mechanism 238 is located below the level of the toeward tape strip fabricating mechanism 236.

Referring now to FIGS. 4 and 5, an alternately structured pincers jaws 478 may be used in the apparatus in lieu of the pincers jaw 366 shown in FIG. 3. A pincers housing 480 is provided which is substantially identical to the pincers housing 366 shown in FIG. 3. The pincers housing 480 has an enlarged vertical slot 482 formed therein and a fixed upper jaw 484 formed at its extending end. An arm 486 is similarly pivotally mounted at its midportion in the pincers housing 480 by means of a pivot pin 488 in such a manner that one end of the arm 486 is contained within the slot 482 and the other end of the arm 486 extends outwardly of the pincers housing 480 and below the fixed upper jaw 484. The outwardly extending end of the arm 486 is formed into a lower jaw 490 and the inwardly extending end of the arm 486 is formed into a clevis 492. Formed in the extending end of the pincers housing 480 is a guideway 494 in which an actuating slide 496 is slidably contained. One end of the actuating slide 496 is contained interiorally of the pincers housing 480 and the other end of the actuating slide 496 protrudes beyond the end of the fixed upper jaw 484. The end of the actuating slide 496 which is contained within the pincers housing 480 is formed into a clevis 498. A link 500 is contained within the slot 482 and is pivoted to the clevis 498 by means of a pin 502 and to the clevis 492 by means of a pin 504. When the pincers jaws 478 are in an open position (see FIG. 4) the link 500 is inclined such that the pin 504 is located more forwardly than the pin 502. It may thus be seen that when the pincers jaws 478 is carried towards the tape guide block 388, the protruding end of the actuating slide 496 may abut the tape guide block 388 so that continued rearward movement of the pincers housing 480 may cause the actuating slide 496 to slide forwardly in the guideway 494 with respect to the pincers housing 480. This movement of the actuating slide 496 causes the link 500 to pivot about the pin 502 (in a clockwise direction as seen in FIG. 4) so as to impart a downward component of motion to the arm 486 at the pin 504, thus causing the lower jaw 490 to pivot upwardly (clockwise as seen in FIG. 4) towards the fixed upper jaw 484 to thereby close the pincers 478. The dimensions of the actuating slide 496, link 500, arm 486 and the pins 502, 504 connecting them are such that when the actuating slide 496 has been moved forwardly in the guideway 494 and the pincers 478 are completely closed, the pins 502, 504 are in vertical alignment with each other, the effect of which is to lock the pincers jaws 478 in a closed position and preclude opening thereof by application of a force applied to the lower jaw 490. The pincers jaws 478 may be opened by means of abutment of the upwardly extending end 506 of the link 500 with the abutting end 468 of either of the pincers deactivators 466, 467 which will cause a counterclockwise pivoting of the link 500 (as seen in FIG. 4) to thereby pivot the lower jaw 490 downwardly and away from the fixed upper jaw 484.

With the machine in an idle condition, a shoe assembly W, that includes last L, having an insole I located on and in general alignment with the bottom of the last, is placed bottom-up in the machine with its heel end supported by the heel supporting device 10 and its toe end supported by the toe supporting device 54 as more fully disclosed in the aforementioned application Ser. No. 548,446 filed May 9, 1966. This is followed by an actuation of the motors 154 to move the hangers 170 and the pressing and insole molding devices 178 downwardly to cause tape strips S to be applied to the shoe assembly as shown in FIG. 20 and as disclosed more fully in the aforementioned application Ser. No. 548,446 filed May 9, 1966. It should be noted that the tape strips S which are to be applied to the shoe assembly in any given cycle of the machine are fabricated and drawn forwardly into the hangers 170 during the preceding machine cycle so that when a shoe assembly is presented to the machine the tape strips S which are to be applied thereto will be in a position to be applied directly when the motors 154 are actuated. The machine control circuit is constructed accordingly so that the tape strip fabricating mechanisms 256 and 258 are actuated towards the end of the operating cycle of the machine and the pincers jaws 366 or 478 are not caused to draw the tape ribbons forwardly into the hangers 170 until the last L and insole I which are in the machine during that cycle have been placed in the machine. Thus when the machine is in an idle condition the tape strips S will be supported by the hangers 170 in readiness for the presentation of a shoe assembly to the machine. After the last L and the insole I have been secured to each other by the tape strips S the motors 154 are actuated to return the hangers 170 and the devices 178 to their original upper positions and the shoe assembly is removed from the supporting devices 10 and 54.

As mentioned earlier the tape strips S are drawn into position in the tape guides 170 at the end of each cycle of operation of the machine so as to be in readiness for the subsequently presented shoe assembly and to avoid interference between the pincers jaws 366 or 478 and the insole pressing and molding mechanism. The backing strip applying mechanisms, however, being disposed in the machine so as to be incapable of mechanical interference with any other mechanism, may be actuated at any time during the cycle of operation of the machine prior to the operation of the pincers jaws 366 or 478 to draw the tape ribbon R into position in the tape guides 170. Thus, at some time between the introduction of the shoe assembly into the machine and actuation of the motors 154 to raise the devices 178 from the shoe assembly, the control circuit causes actuation of the motors 346 such that the piston rods 348 are initially driven outwardly thereof and immediately retracted inwardly, the clutch 344 slipping during the outward movement of the piston rods 348 and becoming locked during the inward movement of the piston rod 348 to thus cause the rollers 334, 335 to rotate in a direction that is towards the housing 266. The paper ribbon P which is interposed between the rollers 334, 335 is thus advanced towards and into the housing 266. The paper P is guided through the housing 266 between the pin 286 and the anvil 280 so that it is spaced between the anvil 280 and the adhesive side of the tape ribbon R, the rollers 334, 335 having rotated an amount sufficient to advance the leading edge 288 of the paper ribbon P beyond the edge of the tape ribbon R such that the paper ribbon P completely overlaps a length of the tape ribbon R.

The timing of the control circuit of the machine is such that after the paper ribbon P has been advanced, motor 320 is actuated to move the hammer 306, with the knife 310 and retaining pins 322 towards the anvil 280. As the hammer 306 advances towards the anvil 280, the retaining pins 322 engage the tape ribbon R and overlapping end of the paper ribbon P and press them against the anvil 280 to thus maintain them in their overlapping relationship during the subsequent pressing and cutting operations. As the hammer 306 continues to advance towards the anvil 280 the retaining pins 322 retract therein and the pressing surface 308 of the hammer 306 presses the tape ribbon R and paper ribbon P into adhesion. At approximately the same time as the paper and tape ribbons P, R are being so pressed, the knife 310 engages the knife 316 to sever the adhered portion of the paper ribbon P from the remainder thereof. After the backing strip B has been so applied the control circuit of the machine causes actuation of the motor 302 to withdraw the hammer 306 and the devices mounted thereto to their original, idle positions, away from the anvil 280, thus permitting the tape ribbon R with the backing strip B adhered thereto to be withdrawn downwardly out of the housing 266 upon actuation of the tape advancing mechanism.

After the backing strip B has been applied to the tape ribbon R and the motors 156 have been actuated to withdraw the support members 158, 162 and the mechanisms mounted thereto upwardly to their out-of-the-way, idle position, the control circuit of the machine causes the motor 368 to be actuated to move the cylinder 372 thereof forwardly. Such actuation of the motor 368 is effecting by means of the cables 374 and pulleys 378 to move the trolleys 360, support bar 364 and thus the open pincers jaws 366 or 478 rearwardly through the tape guides, across the table 4 between the open knives 310, 316 and into the slot 400 formed in the tape guide block 388, where the free end of the tape ribbon R (having a tab T formed thereon) is located. As the pincers jaws 366 or 478 are carried into the slot 400, the upper and lower jaws thereof initially embrace the free end of the tape ribbon R and the protruding end of the actuating silde 454 or 446 is brought into abutment with the end of the stop bolt 401. With movement of the actuating slide 454 or 496 having been arrested by means of its abutment with the stop bolt 401 the continued actuation of the motor 368 causes the pincers housing 428 or 480 to continue its rearward movement, thus causing the pincers jaws 366 or 478 to close about and grip the free end of the tape ribbon R, the rearward movement of the pincers housing terminating upon closure of the jaws associated therewith. When the pincers jaws 366 or 478 have closed they are caused to be locked in such a closed position either by means of the aforementioned hooked spring 460 or the vertical alignment of the pins 502 and 504, depending on whether the pincers jaws 366 or pincers jaws 478 is being used in the machine.

When the free ends of the tape ribbon R have been so gripped and the pincers jaws 366 or 478 locked, the control circuit of the machine causes the motor 368 to be actuated to move the cylinder 372 thereof rearwardly, thereby drawing the pincers jaws 366 or 478 forwardly and laterally over the shoe assembly, through the tape guides 170 and into engagement with the pincers deactivators 466, 467, so as to draw the tape ribbons R forwardly therewith through the tape guides 170 so that the edges of the tape ribbons R may be contained within and supported by the tape guides 170. The breastline pincers deactivators 466, extending more rearwardly than the ballbreak pincers deactivator 467, is thus the first to engage its associated pincers jaws 366 or 478. As the support bar 364 is moved forwardly the upwardly extending leg 450 of the bellcrank 442 or the upwardly extending end of the link 500, depending on the type of pincer jaws used, is brought into engagement with the abutting end 468 of the breastline pincers deactivator 466 thereby arresting the purely forward movement of the bellcrank 442 or link 500 whereupon continued actuation of the motor 368 may continue to carry the support bar 364 and pincers housing 428 forwardly thereby causing the bellcrank 442 or link 500 to pivot in the aforementioned manner to cause lower pincer jaw 438 or 490 to pivot downwardly away from the fixed upper pincer jaw 432 or 484 and thus open the pincer jaws 366 or 478. As the pincers jaws 366 or 478 is opened the berastline tape ribbon R is released. As mentioned above, the abutting end 468 of each of the pincer jaws deactivators 466, 467 is adjusted so that when the tape ribbon R is released the tape strip S portion thereof will be properly disposed above the shoe assembly and with respect to the cutting plane of the scissor blades 414. The spring 474 is of such strength as to be able to substantially resist forward movement of the rod 470 as the pincers jaws 366 or 478 are being opened but to yield and permit such forward movement after the pincers jaws have been opened and the tape ribbon R released, thus permitting the support bar 364 to continue its forward movement to the ballbreak pincers deactivator 467.

After the breastline tape ribbon R has been released the ballbreak tape ribbon R continues to be drawn forwardly until the bellcrank 442 or link 500 of the ballbreak pincers jaws 366 or 478 engages the abutting end 468 of the ballbreak pincers jaws deactivator 467 to thus cause the ballbreak pincers jaws to open and release the ballbreak tape ribbon R in the same manner as above described for the breastline pincers jaws 366 and 487. The abutting end 468 of the ballbreak pincers deactivator 467 is similarly adjusted to extend rearwardly a predetermined distance so as to cause the ballbreak tape ribbon R to be of the desired greater length and released in proper disposition with respect to the shoe assembly. When the ballbreak pincers jaws 366 or 478 has fully opened the forward movement of the support bar 364 is arrested by means of the abutting engagement of the ballbreak pincer jaws deactivator 467 and the bellcrank 442 or link 500. In order to prevent damaging of the ballbreak pincers jaws 366 or 478 the stop bolt 380 may be adjusted so as to engage the support bar 364, to terminate its forward movement, when the ballbreak pincer jaws 366 or 478 has opened an amount sufficient to release the tape ribbon R advanced thereby.

After the motor 368 has caused the pincers jaws 368 to so advance the tape ribbons R, the control circuit of the machine causes actuation of the motors 408 to initially draw each piston rod 410 inwardly thus effecting a cutting stroke of the blades 414 and severing the tape strips from the remainder of the tape ribbons R, and immediately thereafter urge the piston rods 410 thereof outwardly to return the blades 414 to their idle, open position. When the severance of the tape strips S is complete a fresh shoe assembly may be introduced into the machine and the cycle started anew.

We claim:

1. An apparatus for applying a strip of paper to at least a portion of the adhesive side of a pressure sensitive tape strip comprising: a housing having the interior surface of a wall thereof defining a flat anvil; a hammer contained within said housing and being mounted thereto for movement in a direction which is towards and away from said anvil; drive means for effecting said movement of said hammer; a moveable knife, rigidly secured to said hammer for movement therewith and having a heightwise disposed cutting edge projecting towards said anvil; a stationary knife mounted to said wall of said housing and having a heightwise disposed cutting edge projecting towards said cutting edge of said moveable knife in such a manner that upon actuation of said drive means to move said moveable knife towards said anvil, said cutting edges of both of said knives may cooperatively effect a cutting stroke in a heightwise cutting plane; means for introducing a strip of tape into said housing in such a manner that said tape strip is disposed between said anvil and said hammer and to one side of said knives with the plane of said tape strip being substantially parallel to that of said anvil and the lengthwise dimension of said tape strip being vertcially disposed; and means for introducing the free end of a strip of paper into said housing in such a manner that said free end overlaps at least a portion of and faces the adhesive surface of said tape strip, the plane of said free end of said strip of paper being substantially parallel to that of said tape strip and said anvil thereby actuation of said drive means may simultaneously move said hammer towards said anvil to press said tape strip and free end of said paper strip therebetween and effect a cutting stroke of said knives to sever said adhered free end from the remainder of said strip of paper.

2. An apparatus for fabricating a tape strip having an adhesive midportion and non-adhesive tabs at the ends thereof comprising: a housing having the interior surface of a wall thereof defining a flat anvil; a hammer contained within said housing and being mounted thereto for movement in a direction which is towards and away from said anvil; drive means for effecting said movement of said hammer; a movable knife, rigidly secured to said hammer for movement therewith and having a heightwise extending cutting edge projecting towards said anvil; a stationary knife mounted to said wall of said housing and having a heightwise extending cutting edge projecting towards said cutting edge of said moveable knife in such a manner that upon actuation of said drive means to move said moveable knife towards said anvil, said cutting edges of both of said knives may cooperatively effect a cutting stroke in a heightwise plane; means for introducing the leading end of a ribbon of tape into said housing in a vertically downward direction and in such a manner that a trailing portion of said tape ribbon is disposed between said anvil and said hammer and to one side of said knives with the plane of said trailing portion being substantially parallel to that of said anvil and the lengthwise dimension of said trailing portion being vertically disposed; means for introducing a ribbon of paper into said housing from the other side of said knives in a direction which is substantially normal to the vertically downward direction of travel of said tape ribbon and in such a manner that the leading end of said paper ribbon intersects the cutting plane of said knives and overlaps said trailing portion of and faces the adhesive surface of said tape ribbon, the plane of said leading end of said ribbon of paper being substantially parallel to that of said tape ribbon and said anvil whereby actuation of said drive means may simultaneously move said hammer towards said anvil to press said tape ribbon and leading end of paper ribbon into adhesion therebetween and effect a cutting stroke of said knives to sever said adhered leading end from the remainder of said paper ribbon thereby depositing a non-adhesive backing strip of paper to said tape ribbon; means for advancing said tape ribbon to thereby withdraw said non-adhesive backing strip portion from between said hammer and anvil and to present a new trailing portion of said tape ribbon between said hammer and anvil, said advancing means being so constructed and arranged as to advance said tape ribbon a predetermined distance such that when a non-adhesive backing strip is subsequently deposited on said tape ribbon an adhesive surface of said tape ribbon may remain exposed between said initially and subsequently deposited non-adhesive backing strips; and cutting means, located along the path travelled by said tape ribbon after said backing strips have been deposited thereon and being so positioned along said path so that the cutting plane of said cutting means is located centrally of said initially deposited backing strip after said advancing means has advanced said tape ribbon to present said new, trailing portion thereof between said hammer and anvil.

3. An apparatus as recited in claim 2 wherein that portion of said hammer which faces said anvil is fabricated from a material of a resiliency such that the entire overlapping portions of said tape and paper ribbons may be firmly pressed together.

4. An apparatus as recited in claim 2 wherein said means for introducing the leading end of said ribbon of tape into said housing comprises: an upper roller rotatably mounted to the top of said housing; and a lower roller rotatably mounted to the bottom of said housing, said housing having an opening formed in the top and bottom thereof, said rollers being in vertical alignment such that when said tape ribbon is brought to bear against said rollers it may be vertically disposed within said housing in a plane substantially parallel to that of said anvil and located to one side of said knives and said openings being in vertical alignment with said rollers to permit said tape ribbon to pass through said openings and through said housing.

5. An apparatus as recited in claim 2 further comprising: a pair of vertically spaced retaining pins mounted for axial movement to said hammer and extending therefrom towards said anvil, said pins being biased in their extended position whereby upon actuation of said hammer drive means said retaining pins may initially press said tape ribbon and said overlapping paper ribbon together and against said anvil thereby precluding disorientation of said overlapping tape and paper ribbons whereupon continued actuation of said hammer drive means may move said hammer to completely press said ribbons into adhesion, during which movement said retaining pins may be retractably urged into said hammer.

6. An apparatus as recited in claim 2 further comprising: a frame, said housing being secured to said frame; and wherein said means for advancing said tape ribbon to present a new trailing portion of said tape ribbon between said hammer and anvil comprises: guide means mounted to said housing and being so constructed and arranged as to support and guide said tape ribbon such that at least a portion of the leading end thereof remains free and unsupported; gripping means mounted to said frame for movement between a first position remote from said guide means and a second position adjacent said guide means and being actuable to grip said free and unsupported portion of said leading end of said tape ribbon when in said second position whereby subsequent to actuation of said gripping means to grip said leading end of said tape ribbon, said gripping means may be moved to said first position thereby drawing said tape ribbon therewith and through said housing to present a new trailing portion thereof between said hammer and anvil; and drive means for effecting movement of said gripping means between said first and second positions.

7. An apparatus as recited in claim 6 wherein said guide means comprises: a guide block having a passageway formed therethrough, said passageway having an entrance end and an exit end and being of sufficient dimensions to permit said tape ribbon to pass therethrough, said exit end of said passageway being so oriented as to cause the leading end of said tape ribbon which extends therefrom to extend towards said gripping means when said gripping means is in said second position.

8. An apparatus as recited in claim 6 wherein said gripping means comprises: a pincers having jaws which are moveably actuable between an open, non-gripping position and a closed, gripping position; and means for actuating said jaws to said closed, gripping position when said pincers is in said second position to thereby grip said leading end of said tape ribbon.

References Cited

UNITED STATES PATENTS

| | | | |
|---|---|---|---|
| 2,600,322 | 6/1952 | Raney | 156—522 X |
| 2,864,285 | 12/1958 | Roselius | 156—552 X |

VERLIN R. PENDEGRASS, Primary Examiner

U.S. Cl. X.R.

156—552

UNITED STATES PATENT OFFICE
CERTIFICATE OF CORRECTION

Patent No. 3,516,892 Dated June 23, 1970

Inventor(s) Michael M. Becka, et al

It is certified that error appears in the above-identified patent and that said Letters Patent are hereby corrected as shown below:

Column 1: line 22, change "patent" to --parent--.

Column 14: line 67, change "thereby" to -- whereby--.

SIGNED AND SEALED OCT 6 - 1970

(SEAL)
Attest:

Edward M. Fletcher, Jr.
Attesting Officer

WILLIAM E. SCHUYLER, JR.
Commissioner of Patents